United States Patent [19]

Su

[11] Patent Number: 5,982,545
[45] Date of Patent: *Nov. 9, 1999

[54] STRUCTURE AND METHOD FOR MANUFACTURING SURFACE RELIEF DIFFRACTIVE OPTICAL ELEMENTS

[75] Inventor: Jung-Chieh Su, Hsinchu, Taiwan

[73] Assignee: Industrial Technology Research Institute, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/953,417

[22] Filed: Oct. 17, 1997

[51] Int. Cl.$^6$ .................................................. G02B 5/18
[52] U.S. Cl. ............................................ 359/569; 359/566
[58] Field of Search .................................... 359/566, 569, 359/571, 574, 15

[56] References Cited

U.S. PATENT DOCUMENTS

| | | | |
|---|---|---|---|
| 3,650,595 | 3/1972 | Gerritsen et al. | 359/569 |
| 4,426,130 | 1/1984 | Knop | 350/162 |
| 4,679,901 | 7/1987 | Dammann et al. | 359/575 |
| 5,473,448 | 12/1995 | Yoshinaga et al. | 359/51 |
| 5,675,691 | 10/1997 | Edlinger et al. | 359/566 |
| 5,760,960 | 6/1998 | Lin et al. | 359/566 |
| 5,835,643 | 11/1998 | Fukumoto et al. | 385/37 |

OTHER PUBLICATIONS

Vol. 10, No. 12/Dec. 1993/J. Opt. Soc. Am. A of Article entitled "Multilayer modal method for diffraction grating of arbitrary profile, depth and permittivity" by Lifeng Li, Optical Sciences Center, University of Arizona, Tucson, AZ 85721.

Vol. 34, No. 14/ May 10, 1995/ Applied Optics of Article entitled "Design considerations of form birefringment microstructures" by Ivan Richter, Pang–Chen Sun, Fang Xu and Yeshayahu Fainman.

Vol. 14, No. 3/Mar. 1997/J. Opt. Soc. Am. A of Article entitled "Vector Fresnel equations and Airy formula for one–dimensional multilayer and surface–relief gratings" by Sumanth Kaushik, Sandia National Laboratories, Albuquerque, New Mexico 87185–1405.

(List continued on next page.)

*Primary Examiner*—Jon Henry
*Attorney, Agent, or Firm*—Michael D. Bednarek; Crowell & Moring LLP

[57] ABSTRACT

A structure and method for manufacturing surface relief diffractive optical elements are disclosed in the invention, which combines surface relief grating structure and gradient refractive index. Unlike the prior art, the invention does not require control of grating profile structure to modulate the optical path difference of incident light beam. Furthermore, control of grating profile makes the fabrication process more complicated and difficult. This method according to the invention comprises the following steps. A refractive index distribution layer is formed on a substrate by a thin film coating technology with controlled refractive index distribution, thereby the optical path difference is introduced when a incident light beams impinges the refractive index distribution layer. Then a spinning coated photoresist layer on the refractive index distribution layer. In addition, the distribution specification of the refractive index layer can be calculated and/or designed by a rigorous coupled wave theory with parameters, such as depth of the fringe pattern and required diffraction efficiency. Thereafter, a required interference fringe pattern can be transferred into the photoresist layer using a photolithography technique, laser direct writing or two laser beam interference techniques. Next, the required fringe pattern is formed on the photoresist layer via developing and fixing. Finally, the required fringe pattern is fabricated in the refractive index distribution layer by a dry ion beam etching technique, then removing the photoresist layer. In comparison with the prior art, the invention has advantages of easy fabrication of grating profile, feasibility of diffraction efficiency control, suitability for high-volume production and low cost.

8 Claims, 3 Drawing Sheets

OTHER PUBLICATIONS

Vol. E78–C, No. 3/Mar. 1995/ IEICE Trans. Electron. of Article entitled "Blazing Eddects of Dielectric Grating With Periodically Modulated Two Layers" by Tsuneki Yamaski member.

Vol. 31, No. 6 pp. 1931–1939/Nov.–Dec. 1996/Radio Science of Article entitled "Analysis of electromagnetic fields in inhomogeneous dielectric gratings with periodic surface relief." By Tsuneki Yamaski, Hirotaka Tanaka, Takashi Hinata and Toshio Hosono, Department of Electrical Engineering, College of Science and Technology, Nihon University, Tokyo.

Vol. 20, No. 8/Apr. 15, 1998/Optics Letters of Article entitled "High–efficiency multilayer dielectric diffraction gratings" by M.D. Perry, R. D. Boyd, J.A. Britten, D. Decker and B.W. Shore, Lawrence Livermore National Laboratory, P.O. Box 808, L–493, Livermore, California 94550 and C. Shannon and E. Shults Hughes Electro–Optic Systems, 2000 East El Segundo Boulevard, El Segundo, California 90245.

Vol. 35, No. 22/ Aug. 1, 1995/ Applied Optics of Article entitled "Fourier–transform design and electron cyclotron resonance plasma–enhanced deposition of lossy graded–index optical coatings." By Pavel V. Bulkin, Pieter L. Swart, and Beatrys M. Lacquet, Sensors and Ssignal Processing Research Group, Materials Labatoory, Faculty of Engineering, Rand Afrikaans Univeristy, P.O. Box 524, Auckland Park 2006, South Africa.

Vol. 131, No. 10/Oct. 1984/J. Electrochem. Soc.: Solid State Science and Technology of Article entitled "The Variation of Physical Properties of plasma–Deposited Silicon Nitride and Oxynitride with Their Compositions" by V.S. Nguyen, S. Burton and P. Pan, IBM General Technology Division, Essex Junction, Vermont 05452.

Vol. 36, No. 10/ Apr. 1, 1997/Applied Optics of Article entitled "Graded–index diffractive structures fabricated by thermal ion exchange." By Risto–Pekka Salmio, Jyki Saarinen, Jari Turunen, and Ari Tervonen, Department of Engineering Physics and Mathematics, Helsinki University of Technology, FIN–02510 Espoo, Finland.

Vol. 15, No. 4/Jul./Aug. 1997/J. Vac. Sci. Technol. A of Article entitled "Fabrication and characterization of graded refractive index silicon oxnitride thin films" by S. Callard, A. Ganaire and J. Joseph, Department of Physics and Chemistry Leame CNRS UMR 5512, Ecole Centrale Lyon Ecully 69 130 France.

STRUCTURE AND METHOD FOR MANUFACTURING SURFACE RELIEF DIFFRACTIVE OPTICAL ELEMENTS

BACKGROUND OF THE INVENTION

1. Field of the Invention

The present invention relates to surface relief diffractive optical elements, and in particular to surface relief diffractive optical elements having diffraction structure with a refractive index variation distribution layer.

2. Description of the Invention

Typical diffractive optical elements or grating elements can be classified into two types as follows. One type is volume diffractive optical elements in which three kinds of exposure materials are used. The first kind of exposure material is photopolymer which has the advantages of high diffraction efficiency and some even no need to use chemical agents for developing and fixing, but its high cost results in being not ready for cost effective production even high-volume replication process exists. The second kind of exposure material is silver halide emulsions which has high photo-sensitivity and makes photographing simpler than other recording materials, but it suffers from low diffraction efficiency, if no bleaching, and is vulnerable to humid. The third kind of exposure material is dichromate gelatin (DCG), which has relatively high diffraction efficiency, but also suffer from the same humidity problem as silver halide emulsions. Therefore, these three kinds of exposure materials are not suitable for cost effectively mass production of high efficiency diffractive optical elements. Surface relief type diffractive optics is the most common choice for mass production of diffractive optical elements and/or gratings. A quartz, glass, silica or semiconductor material in the forms of thin film or substrate into which a fringe pattern of computer generated hologram(CGH) was fabricated by photolithography and followed by dry ion beam etching or chemical etching process. Another fabrication method of surface relief diffractive optical elements is using photoresist as exposure material and directly interfering with two laser beams. That is, a substrate coated with a photoresist layer, similar to photolithography process, is subject to a laser beam exposure process and forming interference fringe pattern onto the photoresist layer. Thereafter, fringe pattern was inscribed into substrate by a dry and/or wet etching process. In order to form a nickel mandrel or mode for high-volume production, the complete fabricated substrate, coated with a thin conducting metal layer, e.g., Ag, was immersed in electroplating solution for Ni electroforming. The mode or mandrel mentioned above can be used for plastic injection molding, embossing and stamping, etc., and has the advantages of ease mass production and low cost. Moreover, the surface relief diffractive optics is more durable in high humidity environment than the volume types. However, surface relief diffractive optics usually suffer from lower diffraction efficiency, when optical systems require each optical components should meet their presumed high enough light modulation efficiency. For diffractive optical elements, the light modulation efficiency, i.e., diffraction efficiency, is depending on the fringe cross-section profile of interference fringe pattern. In words, high diffraction efficiency is the main target for most diffractive optical elements application cases. According to theoretical analysis, a blazed or high aspect ratio grating and/or etch profile can be more efficient than other profiles. Practically, by wet or dry ion beam etching, the above factor is hard to control and be achieved during fabrication process. For wet etching, the pitch undercut (over-etching) phenomena always destroys the fine grating/fringe pitches. On the other hand, an etch profile, with high aspect ratio, of high-resolution interference fringes is also difficult to be obtained by dry ion beam etching. Therefore, various methods of fabricating blazed grating or diffractive optical elements according to the prior art are disclosed. For example, a blazed grating element can be produced by a staircase structure approach, which uses multi-step mask alignment, exposure and dry etching process. As shown in FIG. 1, a to near blazed multi-level grating profile structure 20 is formed on a quartz or silicon substrate 10 by a photolithography technique using multi-steps electron beam photo masks and dry ion beam anisotropic etching technique. Alternatively, as shown in FIG. 2, a blazed grating structure 40 is formed on a quartz or silicon substrate 30 by a gray-tone mask 50 lithography technique to create blazed photoresist grating layer, then, and etch into substrate. The above-mentioned gray-tone exposure process can also be replaced with a laser or electron beam direct writing process to perform the multi-steps exposure, although laser writing system sometimes does not have enough resolution to write a fringe pattern. In the methods mentioned above, by controlling the grating/etch profile shape, enhancement of first-order diffraction and reducing or eliminating unnecessary diffraction orders are achieved. Highly expensive gray-tone mask, electron beam and multi-steps masks make the fabrication process much more costly, moreover, the processing difficulty arising from the precise alignment and positioning become troublesome.

In the prior art of U.S. Pat. No. 4,426,130, a layer of transparent material having effectively two serially spaced sinusoidal phase gratings of the same line spacing, each formed as a surface relief pattern. Practically, by means of thin film coating technique, it is hard to make such a structure to superpose two or more gratings precisely in series thereon. In view of the above, to resolve the above-encountered problems, the object of the invention is to provide a method for manufacturing high-efficiency surface relief diffractive optical elements by using a grating material layer with continuous or discrete, i.e., multi-layer, refractive index variation distribution which was obtained by a refractive index controlled coating and, thereafter, a dry ion beam anisotropic etching process. Therefore, surface relief diffraction elements having high efficiency can be created by the conventional thin film coating and dry etching technologies without the processes of using costly electron beam masks or gray tone masks as well as multi-level lithography which uses repetitively precise mask positioning and aligning techniques.

In principle, a phase grating or diffractive optical elements with surface relief structure is formed on a transparent substrate by a dry etching process. A diffraction phenomenon due to optical path difference is created when a light beam passes through the surface relief structure of the substrate. To surface relief diffractive optical elements or grating, the diffraction efficiency, the ratio of modulated light intensity vs. incident beam intensity, depends on the optical path difference between incident beam and outgoing beam; for example, the grating/etch profile aspect ratio. That is, once the modulation specification of the diffractive optical elements is determined, the interference fringe pattern and optimized grating aspect ratio are also determined. Since an optimized grating aspect ratio means that the sufficient optical path difference can be provided, in order to obtain high diffraction efficiency, how to manufacture surface relief diffractive optical elements having sufficient deep or blazed grating is a very important issue. Since the optical path difference is a function of light path and refractive index of grating material, therefore, control of optical path difference may be achieved by alternatively changing refractive index. In general, a thin film coating process can accomplish this alternative method.

Furthermore, the surface relief structure formed into a quartz or silicon substrate by a photolithography and dry etching process is basically a square or rectangular profile. If the exposure process is performed directly by two laser beam interference, a sinusoidal structure will be formed. However, from the fabrication point of view, it is difficult to form grating profile other than the above two structure types.

The invention combines the above-described surface relief phase grating or diffractive optical elements and gradient refractive index technology to manufacture diffractive optics with high diffraction efficiency. Since, unlike the prior art, it is not necessary to shape the grating profile and/or the aspect ratio of the surface relief structure in order to control the optical path difference of incident light beams, thereby the process becomes difficult and complicated. The present invention has the advantages of making mask alignment easy and suitable for high-volume production, and low cost.

First, a gradient refractive index layer is formed on a substrate by thin film coating technology. This can be only a single layer with continuously gradient refractive index distribution or composed of many discrete layers in which the gradient refractive index is controlled layer by layer. The types of gradient refractive index distribution are categorized into gradually increasing, gradually decreasing and a distribution function. These types of distributions can be analyzed by the rigorous coupled wave theory of diffraction analysis basing on the Maxwell Equations. The rigorous coupled wave theory decomposed the grating layer into many sub-layers and assumed that the incident wave is diffracted into several diffraction orders in each sub-layer with their own refractive indices. A layer-by-layer analysis was done in order to calculate the final intensity of the outgoing light beam. Incorporating with the refractive index of each sub-layer and the boundary condition. The rigorous coupled wave theory provides required diffraction efficiency estimation. Then, the gradient (continuous or discrete/multi-layer) refractive index layer formed on the substrate is designed with layers of different material or composition to meet the required efficiency. A real-time monitoring on the thin film coating process is used so that the gradient refractive index layer is obtained layer by layer with the designed refractive index distribution. Thereafter, the substrate with the gradient index layer is coated with a photoresist for interference fringe pattern transfer. After that, a required interference fringe pattern is formed on the photoresist by lithography using a mask or by laser interference. Finally, the fringe pattern is formed on the substrate by a conventional dry ion beam etching process. As described above, the high-efficiency surface relief diffractive optics is manufactured by etching the substrate on which the gradient refractive index distribution layer is formed without the steps of using costly electron beam masks or gray-tone masks as well as repetitive precise mask positioning and aligning technique.

SUMMARY OF THE INVENTION

A method for manufacturing surface relief diffractive optical elements with high diffraction efficiency according to the invention utilizes a thin film coating and dry ion beam etching process. However, before using a diffractive optical element as a focusing, imaging or scanning element, the structure of the diffractive optical elements is designed according to the specification of the optical system design. By means of ray-tracing and wave-front analysis, the interference fringe pattern of diffractive optical elements or gratings can be determined. For surface relief phase grating or diffractive optical elements, in principle, the required diffraction efficiency is determined by the grating pitch profile. By designing the refractive index distribution of the grating material with rigorous coupled wave theory, this invention utilizes gradient index variation to fabricate the diffractive optical elements with specified diffraction efficiency. Therefore, a complete new design methodology of diffractive optical elements is presented.

BRIEF DESCRIPTION OF THE DRAWINGS

The present invention will become more fully understood from the detailed description given hereinbelow and the accompanying drawings, which are provided for illustration of preferred embodiments only and should not be construed as limiting the scope of the present invention, and wherein.

DETAILED DESCRIPTION OF THE INVENTION

EMBODIMENT 1

Figure 1:
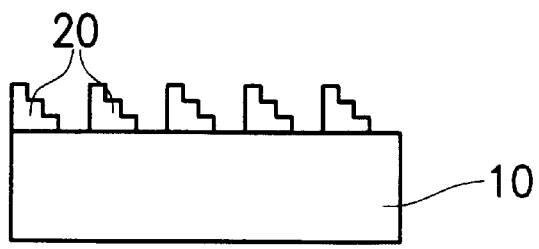
FIG. 1 is a schematic view illustrating a multi-level grating profile of diffractive optical elements or grating fabricated by a multi-step lithography process and precisely ion beam etching process for enhancing the diffractive efficiency of the first-order diffraction and reducing or eliminating other unnecessary diffraction orders.
Figure 2:
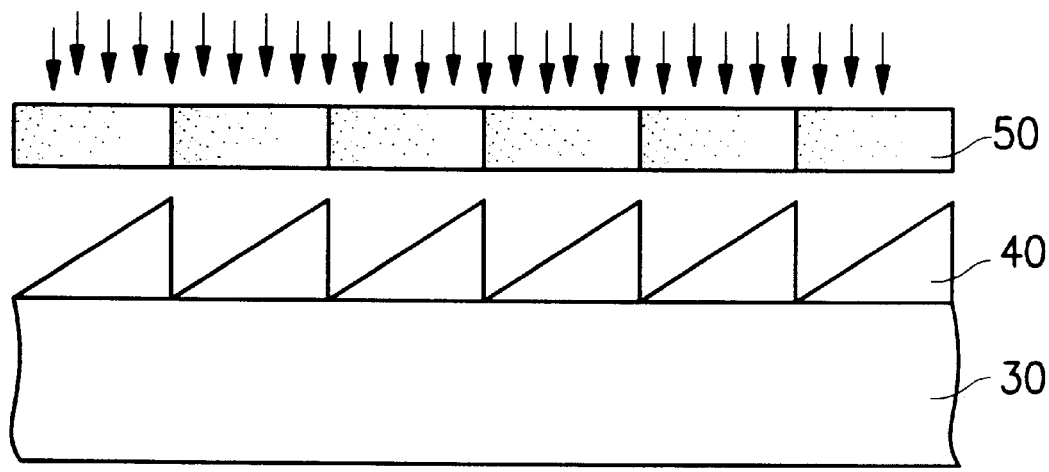
FIG. 2 a schematic view illustrating a blazed grating or diffractive optical elements, wherein the blazed grating profile/structure is manufactured by a gray-tone mask exposure process for enhancing the first-order diffraction efficiency and reducing or eliminating other unnecessary diffraction orders.
Figure 3A:
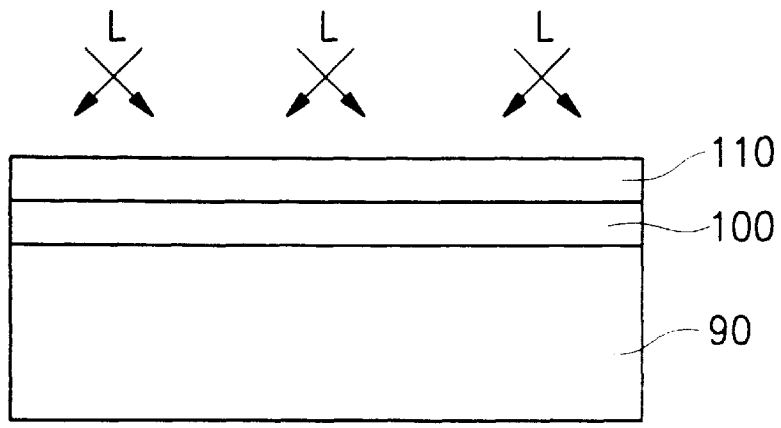
FIGS. 3a through 3d are schematic views showing a method for manufacturing surface relief diffractive optical elements of which grating material having a gradient index according to the first embodiment of the invention.
Figure 3B:
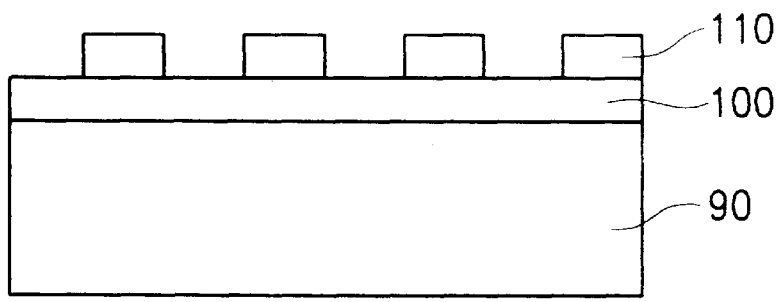
Figure 3C:
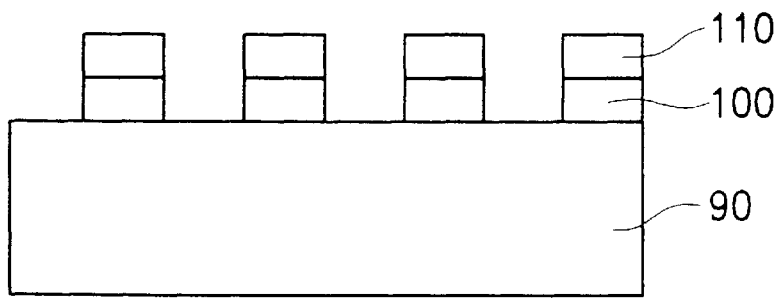
Figure 3D:
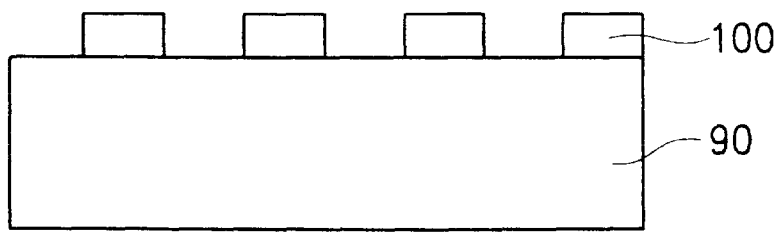

Referring to FIGS. 3a to 3d, a first embodiment of the invention comprises the following steps: (1) As shown in FIG. 3a, a gradient diffraction index layer 100 is formed on a substrate 90 by use of a PECVD or CVD process, wherein the mixing ratio of chemical reaction gas components can be varied through regulating the reaction gas flow rate. According to the required grating material refractive index distribution, a continuous or discrete(multi-layer) gradient index layer can be deposited on the surface of the substrate. For incident visible light, as an example, $SiO_x$, $Si_{1-x}N_x$ or other visible light transparent materials have various refractive indexes through different material composition. However, the composition of transparent materials can be tuned by changing the processing parameters of PECVD, CVD or co-sputtering deposition, etc., wherein optical path difference can be produced when a light beam passes through these transparent grating materials. Then, a photoresist layer 110 is spinning coated on top of the gradient refractive index layer 100. The specification of the gradient refractive index distribution can be calculated by the rigorous coupled wave theory and presumed parameters, such as the interference fringe line-width, grating period, required diffraction efficiency, etc. If the refractive index distribution decreases with incident light beam along normal direction of the gradient layer/film, the diffraction characteristics of the diffracted light beam can be explained due to the gradually narrowing of the total reflection angle inside the gradient index layer. The whole system can be analyzed by rigorous coupled wave and Fourier transform theory. The interference fringe pattern on the photoresist layer 110 can be obtained directly through two laser interfering method. (2) Referring to FIG. 3b, the required interference fringe pattern is formed on the photoresist layer 110 via developing and fixing. (3) As shown in FIG. 3c, an interference fringe pattern is formed on the gradient refractive index layer 100 by a dry ion beam etching process basing on the prior art. (4) Referring to FIG. 3d, the photoresist layer 100 is removed, such that a surface relief diffractive optical element is fabricated.

EMBODIMENT 2

Figure 4A:
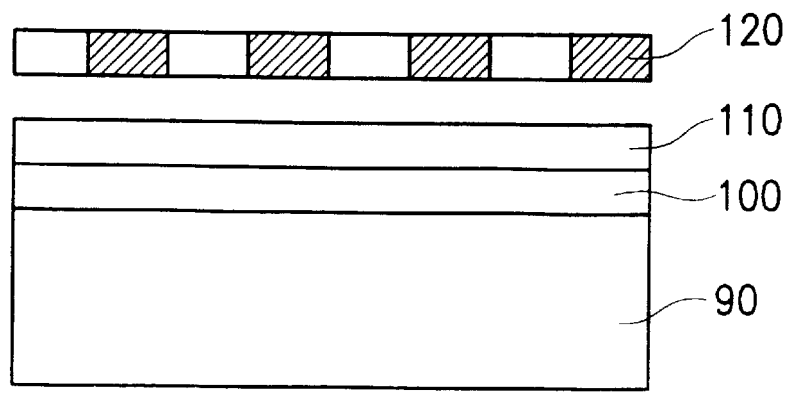
FIGS. 4a through 4d are schematic views showing a method for manufacturing surface relief diffractive optical elements having a gradient refractive index according to the second embodiment of the invention.
Figure 4B:
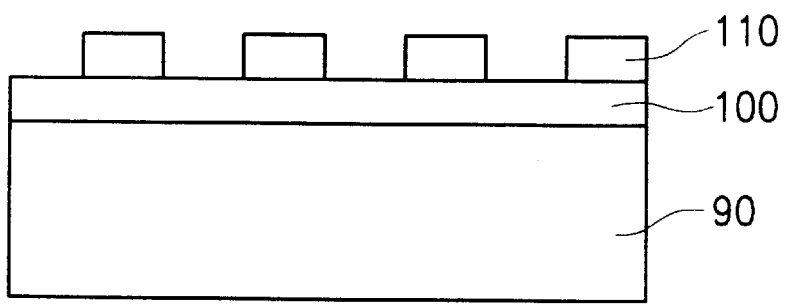
Figure 4C:
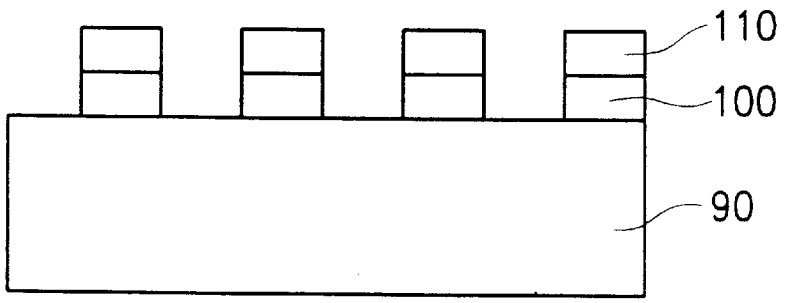
Figure 4D:
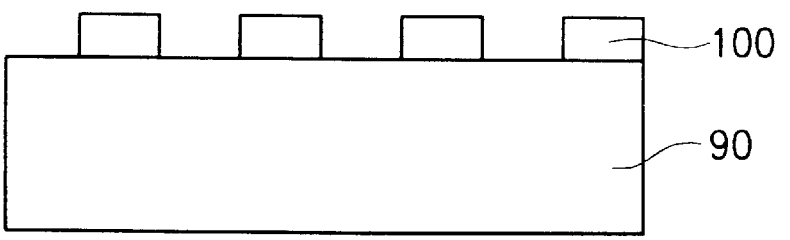

Referring to FIGS. 4a through 4d, a second embodiment of the invention comprises the following steps: (1) As shown in Fig. 4a, a gradient refractive index distribution layer 100 is formed on a substrate 90 by a gradient refractive index distribution thin film coating technology. For example, a $SiO_x$ or $Si_{1-x}N_x$ layer can be deposited by reacting silane and nitrous oxide for $SiO_x$ while silane and ammonia for $Si_{1-x}N_x$. Adjusting the temperature, reactant concentrations and pressure, etc controls the deposition variables. Control of the deposition parameters determines the materials structure and chemical composition of the deposited film, and the optical properties thus changes with the composition of the gradient refractive index distribution layer. For example, the refractive index of silicon dioxide is 1.458 at a wavelength of $0.6328 \mu m$. Deposited oxides with refractive indices above 1.46 are usually silicon-rich; oxides with lower indices are porous. Silicon nitride has a refractive index of 2.01 and also indicates the high refractive indices with a silicon rich film; low indices are caused by oxygen impurity[11]. Then, a photoresist layer 110 is spinning coated on the gradient refractive index layer 100. Similarly, the distribution of refractive index inside the layer can be calculated by a rigorous coupled wave theory and presumed parameters, such as grating period, diffraction efficiency, and the layer number if it is in a multi-layer form, etc. After the layer structure is designed, the interference fringe pattern is transferred, using a mask, into the photoresist layer 110 by photolithography. (2) Referring to FIG. 3b, the required fringe pattern is formed on the photoresist layer 110 via developing and fixing. (3) As shown in FIG. 3c, a fringe pattern is formed on the gradient refractive index layer 100 by a reactive ion beam etcher based on the prior art; (4) Referring to FIG. 3d, finally, the photoresist layer 100 is removed, such that a gradient index grating or diffractive optical element is fabricated.

In the above described two embodiments, the refractive index distribution of the $SiO_x$ is in a range of 1.46 ($SiO_2$) ~2.0(SiO), while the refractive index distribution of the $Si_{1-x}N_x$ is in a range of 1.8~2.2.

The comparison between the invention and the prior art will be described hereinafter. In the prior art, a grating pitch structure is formed on a quartz or silicon substrate by a photolithography and dry ion beam etching process.

The surface relief structure formed on a quartz or silicon substrate by a photolithography and dry etching process is basically a square or rectangular profile. For the multi-level grating profile technology used in the prior art, at least more than 2 masks are required to fabricate the staircase structure to gain an efficiency higher than 70%. For the fringe pattern with a minimum period approximately one micro-meter or less, a four level structure, required two masks, means that a lithography resolution of 0.25 $\mu m$ and mask alignment accuracy of less than 0.1 $\mu m$ are required, which is almost the limitation of the standard i-line stepper. Therefore, the more increasing number of masks, the more difficulty of positioning and aligning in fabrication. The cost of the masks is also raising rapidly as the number of mask increases. On the other hand, for a gray-tone mask used in the prior art, it is difficult to use electron beam direct writing to produce continuous tone on the mask due to the difficulty of controlling the dose of electron flux; significantly, the gray-tone mask is costly. The invention combines thin film coating with dry ion beam etching technology. The optical path difference of incident light beam is controlled by the refractive index distribution of the grating material, instead of the grating profile. Since this invention is one mask process, it has the advantages of easy aligning and positioning. Therefore, the process is low cost and suitable for mass batch production. Furthermore, the high diffraction efficiency is resulted from a refractive index distribution layer that modulates the incident light beam optical path and the basic optical property, i.e., total reflection angle. When the wavelength of an incident light beam is 0.632 m and the aspect ratio remains at about 0.6 for $SiO_2$, the diffraction efficiency of the first-order diffraction is more than 40%. In the prior art, however, the aspect ratio must be larger than 1.5 to attain the diffraction efficiency of 40%, but such a structure is difficult to manufacture.

What is claimed is:

1. A surface relief diffractive optical element comprising:
   a substrate; and
   a gradient refractive index layer, which is substantially transparent to an incident light beam, formed on said substrate and having multi-level grating pitch structure, including depressions and projections, wherein an optical path difference is introduced when the incident light beam passes through said gradient refractive index layer so that the diffraction effect is enhanced and said diffractive optical element having different refractive index distributions is provided with different diffraction efficiencies.

2. An element as claimed in claim 1, wherein said gradient refractive index layer is $SiO_x$ or $Si_{1-x}N_x$.

3. An element as claimed in claim 1, wherein the height-to-width ratio of each grating of said grating pitch structure is less than or equal to 1.

4. An element as claimed in claim 1, wherein said grating pitch structure is square, trapezoid or sinusoidal shape.

5. An element as claimed in claim 1, wherein the refractive index distribution of said gradient refractive index layer is linearly increasing, linearly decreasing or with a continuous distribution function.

6. An element as claimed in claim 1, wherein said gradient refractive index layer is replaced by a multi-layer structure having layers with a refractive index distribution.

7. An element as claimed in claim 1, wherein said gradient refractive index layer is a transparent material of which composition can be varied by changing processing parameters in a plasma enhancement chemical vapor deposition (PECVD) process, chemical vapor deposition (CVD) process or co-sputtering process.

8. An element as claimed in claim 1, wherein the gradient refractive index layer has a transparency larger than 90% to the incident light beam.

* * * * *